United States Patent Office 3,552,062
Patented Jan. 5, 1971

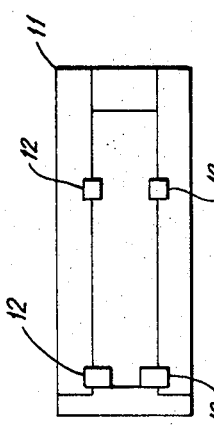
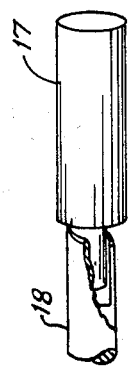
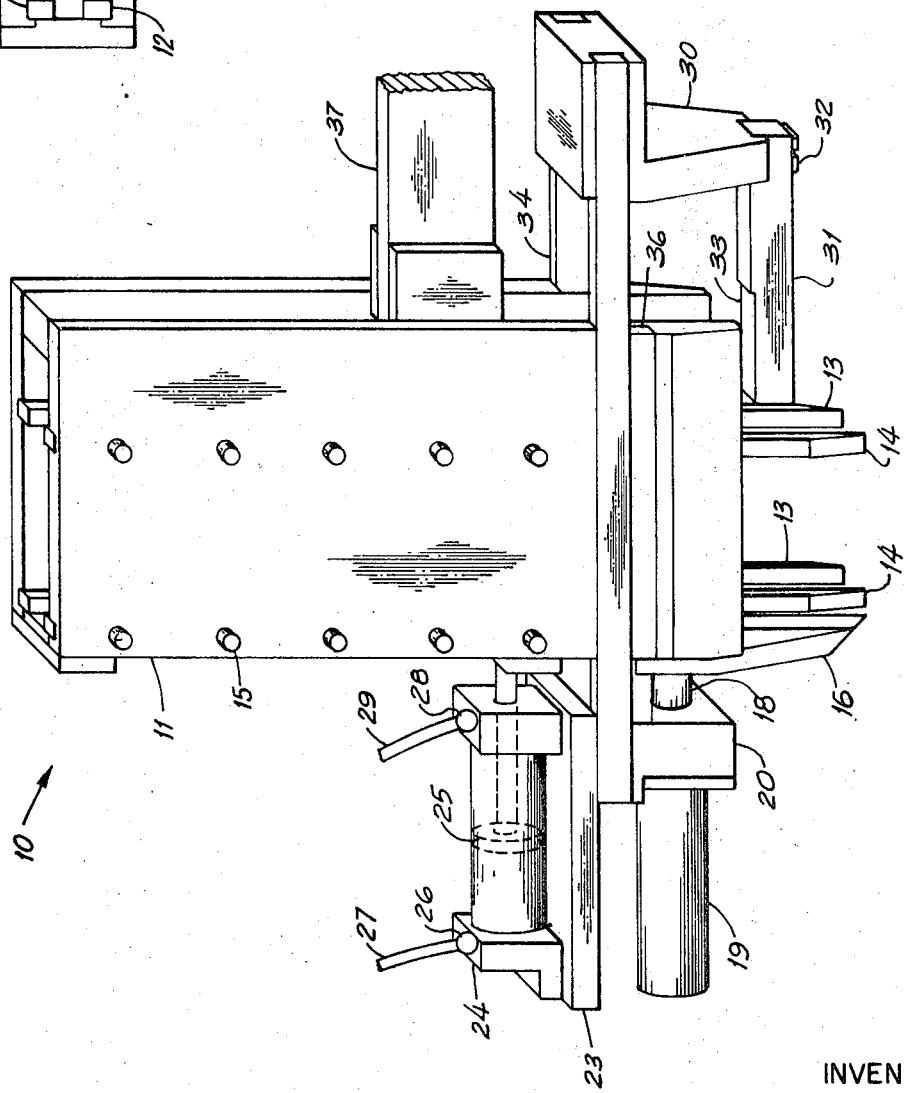

3,552,062
APPARATUS FOR SUPPLYING PARTS
Ithamer M. Brown, P.O. Box 144,
Kirklin, Ind. 46050
Filed Sept. 18, 1968, Ser. No. 760,517
Int. Cl. B24b 47/02
U.S. Cl. 51—215          7 Claims

ABSTRACT OF THE DISCLOSURE

Apparatus for automatically supplying parts to a machine consisting of a magazine to receive and hold the parts with guides along which the parts move, means for releasing a part upon a signal, and means for taking a part which has been released and supplying it to the machine.

BACKGROUND OF THE INVENTION

Field of the invention

This invention relates to apparatus for supplying parts to a machine, and more particularly to apparatus which will automatically supply parts to a machine, such as a grinder or milling machine, in response to a signal from such machine.

Parts which are to be subjected to machining operations, such as a grinding operation, must be supplied to the machine in some manner. Where a large number of parts are to be subjected to the machining operation, some form of automated or semi-automated supply is desirable. Devices to supply parts to a machine have taken the form of movable arms which transport parts from one location to the machine. In such devices, the parts were often held by magnetic force and the devices were fairly complex and involved considerable movement of the arm and other portions of the device.

The present invention provides apparatus for automatically supplying parts to a machine without the necessity of excessive movement of the equipment and without excessive wear on the equipment. Moreover, those portions of the equipment which are subject to the most wear are readily replaceable. The equipment is inexpensive, durable and can be readily adapted to accommodate various types, sizes and shapes of parts.

Parts are loaded into a magazine for storage and automatic feeding to the grinding machine or other machine. The magazine may be loaded manually or automatically. As a part passes out of the magazine and is fed to the machine, another part in the magazine moves into position to be fed to the machine upon the next signal from the machine. In this manner, a constant supply of parts to the machine can be maintained merely by keeping parts loaded in the magazine.

SUMMARY OF THE INVENTION

In one form, the apparatus includes a magazine guide rails within said magazine, finger elements within said magazine and extending externally of said magazine, a movable air cylinder, air-flow control means, means for supplying air to said cylinder, a gate bar adapted to fit under said magazine and between the portions of said fingers externally of said magazine and having a surface adapted to accommodate a part, a cross bar connected between said cylinder and said gate bar and slidably received between a set of guide bars, plunger means adapted to engage and hold a part, spring means biasing said plunger means in a part-engaging position, said plunger means and spring means being connected with said cross bar, said cross bar, plunger means, spring means and gate bar moving as a unit along with movements of said cylinder, whereby said gate bar moves under said magazine when said plunger means moves away from said magazine and releases a part, and said gate bar moves away from said magazine thus releasing the part to the machine being supplied when said plunger means moves to engage the next successive part.

BRIEF DESCRIPTION OF THE DRAWINGS

The full nature of the invention will be understood from the accompanying drawings and the following description and claims.

FIG. 1 is a perspective view of apparatus for supplying parts to a machine;

FIG. 2 is a top view of the magazine portion of the apparatus; and

FIG. 3 is a view of a part which may be supplied by the apparatus to the machine and is shown as being held by the plunger of the apparatus.

DESCRIPTION OF THE PREFERRED EMBODIMENT

FIG. 1 shows in perspective apparatus for supplying parts to a machine for a machining operation, such as grinding. The apparatus is designated generally as 10. A magazine 11 having open ends at its top and bottom is situated in a vertical position. Guide rails 12 are carried within magazine 11 and are so arranged as to serve as guides for the parts which pass through the magazine, such as part 17 (FIG. 3). Finger elements 13 are provided in the lower portion of the magazine 11 and have portions extending outside of and below magazine 11. The lower parts of finger elements 13 are tapered as indicated at 14. Guide rails 12 and finger elements 13 are preferably of hardened tool steel and they are aligned with one another, thus in effect presenting continuous guiding surfaces for the parts inside and immediately below magazine 11. Guide rails 12 and finger elements 13 have smooth surfaces which face the open or center portion of the magazine to permit the parts to readily slide between the guide rails 12 and fingers 13 as the parts drop downwardly in magazine 11. Guide rails 12 and finger elements 13 are secured in place within magazine 11 by means of screws 15 which pass through holes in the outside surface of magazine 11. A spacer 16 is provided adjacent the lower end of magazine 11.

Parts, such as part 17, are placed in the top of magazine 11 and by gravity slide downwardly between guide rails 12 and finger elements 13. The lowermost part in the magazine is held in position by engagement with a plunger 18. Plunger 18 is biased in a part-engaging position (to the right in the drawings) by a spring 19. Plunger 18 and spring 19 are attached to mounting block 20. The portion of plunger 18 which extends into the magazine has a portion adapted to engage and hold the part 17 (FIG. 3). The male end of part 17 engages a female portion of plunger 18. A plunger could be provided having a male connector if the part being supplied to the machine had a female portion. Any other suitable means by which the plunger engages and holds the part may also be used.

A mounting plate 23 is connected to mounting block 20 and an air cylinder 24 is connected to both. Air cylinder 24 is movable with respect to a stationary piston 25. Air flow control valves 26 and 28 regulates the flow of air from air supply lines 27 and 29, respectively. Thus air can be introduced into the cylinder 24 on either side of the stationary piston 25, thereby causing movement of cylinder 24 to the right or to the left.

A cross bar 34, preferably of hardened tool steel, is connected to mounting block 20 at one end and to block 30 at its other end. Block 30 is in turn connected to gate bar 31 by screws 32. Gate bar 31 is provided with a recessed surface portion 33 which is adapted to accommodate a part 17. Gate bar 31 can readily be replaced by others of differing sizes and surface features in order to better accommodate other types and sizes of parts.

Cross bar 34 passes exteriorly of magazine 11 and is supported by and slidably received by guide bars 36. Guide bars 36 are preferably of hardened tool steel and are attached to magazine 11 by screws. Cross bar 34 and guide bars 36 have smooth surfaces so that cross bar 34 is readily slidably between guide bars 36.

The entire apparatus 10 may be connected directly to the grinding machine, or elsewhere if desired, by support arm 37 which is attached to magazine 11.

In the position illustrated in FIG. 1, the lowermost part in magazine 11 is engaged and held by plunger 18 by reason of the force of spring 19. When it is desired to remove a part from the magazine and supply it to the machine, the apparatus is actuated by a signal from the machine, such as an electricl signal. Air from a pressure source (not shown) flows through line 27 and air flow control valve 26. The air pressure is sufficient to cause air cylinder 24 to move rapidly to the left, piston 25 remaining stationary. Since cylinder 24, plunger 18, spring 19, cross bar 34 and gate bar 31 are all indirectly connected to one another, all move as a unit when cylinder 24 moves. Thus as plunger 18 moves to the left releasing a part, gate bar 31 moves under magazine 11 and between the external portions of fingers 13. The released part drops onto surface 33 of gate bar 31. Air is then introduced through line 29 and air flow control 28 causing cylinder 24 to move rapidly to the right. Plunger 18 engages the next successive part in magazine 11 and the apparatus is again in the position illustrated in FIG. 1. As cylinder 24 and gate bar 32 moves rapidly to the right, the part which is resting on surface 33 drops off and into the loading mechanism of the machine being supplied. Of course, the machine being supplied may also receive the part from surface 33 in some manner other than by the part falling.

Adjustments of air flow control valves 26 and 28 permit variation in the speed of movement of cylinder 24. The frequency of the signals which actuate the apparatus can also be varied. The apparatus can be adjusted to vary the number of parts released from the magazine and fed to the machine at one time if it is desired to feed a plurality of parts to the machine at the same time.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

I claim:
1. Apparatus for supplying parts to a machine, consisting of a magazine, guide rails within said magazine, finger elements within said magazine and extending externally of said magazine, a movable air cylinder, air-flow control means, means for supplying air to said cylinder, a gate bar adapted to fit under said magazine and between the portions of said fingers externally of said magazine and having a surface adapted to accommodate a part, a cross bar connected between said cylinder and said gate bar and slidably received between a set of guide bars, plunger means adapted to engage and hold a part, spring means biasing said plunger means in a part-engaging position, said plunger means and spring means being connected with said cross bar, said cross bar, plunger means, spring means and gate bar moving as a unit along with movements of said cylinder, whereby said gate bar moves under said magazine when said plunger means moves away from said magazine and releases a part, and said gate bar moves away from said magzine thus releasing the part to the machine being supplied when said plunger means moves to engage the next successive part.

2. Apparatus according to claim 1 in which said guide rails and said finger means are constructed of hardened material and are individually replaceable.

3. Apparatus according to claim 1 in which said guide rails and said finger means present smooth surfaces to the parts.

4. Apparatus according to claim 1 with the addition of means for supporting said magazine from the machine being supplied with parts.

5. Apparatus according to claim 1 wherein said guide bars are external of and attached to said magazine.

6. Apparatus according to claim 1 wherein the frequency, speed and length of the cylinder movements may be varied.

7. Apparatus according to claim 1 wherein said air cylinder is actuated in response to air provided from an external pressure source.

References Cited

UNITED STATES PATENTS

| | | |
|---|---|---|
| 2,788,620 | 4/1967 | Marcus et al. |
| 2,796,703 | 6/1957 | Bushey et al. |
| 3,089,289 | 5/1963 | Serafin. |

OTHELL M. SIMPSON, Primary Examiner

U.S. Cl. X.R.

82—2.7